US012150409B2

(12) United States Patent
Kemmerer et al.

(10) Patent No.: US 12,150,409 B2
(45) Date of Patent: Nov. 26, 2024

(54) AIRBAG SYSTEM FOR A HARVESTER HEADER

(71) Applicant: CNH Industrial America LLC, New Holland, PA (US)

(72) Inventors: Benjamin David Kemmerer, Hamburg, PA (US); Blaine Robert Noll, Fleetwood, PA (US); Joel Timothy Cook, Akron, PA (US)

(73) Assignee: CNH Industrial America LLC, Holland, PA (US)

( * ) Notice: Subject to any disclaimer, the term of this patent is extended or adjusted under 35 U.S.C. 154(b) by 817 days.

(21) Appl. No.: 17/294,517

(22) PCT Filed: Oct. 23, 2019

(86) PCT No.: PCT/US2019/057708
§ 371 (c)(1),
(2) Date: May 17, 2021

(87) PCT Pub. No.: WO2020/101855
PCT Pub. Date: May 22, 2020

(65) Prior Publication Data
US 2022/0015292 A1    Jan. 20, 2022

Related U.S. Application Data

(60) Provisional application No. 62/768,231, filed on Nov. 16, 2018.

(51) Int. Cl.
*A01D 41/14* (2006.01)
*A01D 57/20* (2006.01)
(Continued)

(52) U.S. Cl.
CPC .......... *A01D 41/141* (2013.01); *A01D 57/20* (2013.01); *A01D 61/002* (2013.01); *A01D 41/06* (2013.01); *A01D 61/008* (2013.01)

(58) Field of Classification Search
CPC .... A01D 41/141; A01D 57/20; A01D 61/002; A01D 41/06; A01D 61/008; A01D 41/14
See application file for complete search history.

(56) References Cited

U.S. PATENT DOCUMENTS

| 4,573,308 A | * | 3/1986 | Ehrecke | ................. | A01D 41/14 |
| | | | | | 56/15.8 |
| 5,157,905 A | | 10/1992 | Talbot et al. | | |

(Continued)

FOREIGN PATENT DOCUMENTS

| WO | 2007/095430 A2 | 8/2007 | | |
| WO | WO-2019055521 A1 | * | 3/2019 | ........... A01B 63/008 |
| WO | WO-2020101841 A1 | * | 5/2020 | ............ A01D 41/14 |

OTHER PUBLICATIONS

PCT International Search Report for PCT application PCT/US2019/057708, mailed Jan. 28, 2020 (11 pages).

*Primary Examiner* — Arpad Fabian-Kovacs
(74) *Attorney, Agent, or Firm* — Peter K. Zacharias; Rebecca L. Henkel; Rickard K. DeMille

(57) ABSTRACT

A header of a harvester includes a cutter bar assembly, a side deck, and an airbag. The side deck includes a conveyor and an arm assembly. The cutter bar assembly is configured to cut crops, and the conveyor is configured to transport the crops cut by the cutter bar assembly toward a center of the header. The arm assembly is coupled to the cutter bar assembly and to the at least one airbag. The arm assembly is configured to pivot to enable the cutter bar assembly to flex along a lateral axis of the header. The airbag is configured to apply a substantially constant force to the at least one arm assembly.

17 Claims, 8 Drawing Sheets

(51) Int. Cl.
*A01D 61/00* (2006.01)
*A01D 41/06* (2006.01)

(56) References Cited

U.S. PATENT DOCUMENTS

| | | | |
|---|---|---|---|
| 5,423,165 A | 6/1995 | Walch et al. | |
| 6,675,568 B2 * | 1/2004 | Patterson | A01D 41/14 56/228 |
| 7,222,475 B2 * | 5/2007 | Bomleny | A01D 41/141 56/10.2 E |
| 7,520,115 B2 | 4/2009 | Coers et al. | |
| 7,726,111 B2 | 6/2010 | Grywacheski et al. | |
| 7,874,132 B2 * | 1/2011 | Sauerwein | A01D 41/141 56/10.2 E |
| 7,930,871 B1 * | 4/2011 | Figgins | A01D 34/283 56/208 |
| 7,950,212 B1 | 5/2011 | Figgins et al. | |
| 8,051,633 B2 | 11/2011 | Figgins et al. | |
| 8,359,822 B2 | 1/2013 | Honas et al. | |
| 8,601,779 B1 | 12/2013 | Figgins et al. | |
| 8,695,315 B2 * | 4/2014 | Coon | A01D 41/06 56/158 |
| 10,462,968 B2 * | 11/2019 | Shearer | A01D 41/141 |
| 10,736,265 B2 * | 8/2020 | Fuchtling | A01D 34/04 |
| 11,109,529 B2 * | 9/2021 | Fuechtling | A01D 34/04 |
| 11,559,000 B2 * | 1/2023 | Brimeyer | A01D 41/141 |
| 11,638,395 B2 * | 5/2023 | Cook | A01D 34/28 56/257 |
| 2007/0193243 A1 * | 8/2007 | Schmidt | A01D 57/20 56/181 |
| 2007/0204584 A1 * | 9/2007 | Coers | A01D 41/14 56/15.8 |
| 2007/0204585 A1 | 9/2007 | Lovett et al. | |
| 2008/0078155 A1 | 4/2008 | Coers et al. | |
| 2008/0271426 A1 * | 11/2008 | Lohrentz | A01D 57/20 56/153 |
| 2008/0276590 A1 * | 11/2008 | Sauerwein | A01D 41/14 56/153 |
| 2009/0277144 A1 * | 11/2009 | Honas | A01D 57/20 56/153 |
| 2009/0277146 A1 * | 11/2009 | Sauerwein | A01D 34/13 56/208 |
| 2009/0277147 A1 * | 11/2009 | Honas | A01D 41/14 56/208 |
| 2009/0277148 A1 * | 11/2009 | Sethi | A01D 57/20 56/208 |
| 2009/0288383 A1 * | 11/2009 | Sauerwein | A01D 57/20 56/181 |
| 2009/0293441 A1 * | 12/2009 | Sauerwein | A01D 57/20 56/208 |
| 2009/0308042 A1 * | 12/2009 | Lovett | A01D 57/20 56/153 |
| 2010/0043373 A1 * | 2/2010 | Lohrentz | A01D 57/20 56/181 |
| 2010/0083629 A1 | 4/2010 | Klotzbach et al. | |
| 2016/0360699 A1 * | 12/2016 | Allochis | A01D 43/06 |
| 2020/0375107 A1 * | 12/2020 | Duerksen | A01D 57/20 |
| 2021/0185875 A1 * | 6/2021 | Noll | A01D 41/14 |
| 2021/0185881 A1 * | 6/2021 | Thomas | A01B 63/10 |
| 2021/0185908 A1 * | 6/2021 | Hunt | A01D 41/1274 |
| 2021/0185915 A1 * | 6/2021 | Hunt | A01D 34/38 |

\* cited by examiner

AIRBAG SYSTEM FOR A HARVESTER HEADER

BACKGROUND

The disclosure relates generally to a harvester header. More specifically, the present disclosure relates to an airbag system for a harvester header.

A harvester may be used to harvest agricultural crops, such as barley, beans, beets, carrots, corn, cotton, flax, oats, potatoes, rye, soybeans, wheat, or other plant crops. Moreover, a combine (e.g., combine harvester) is a type of harvester generally used to harvest certain crops that include grain (e.g., barley, corn, flax, oats, rye, wheat, etc.). During operation of a combine, the harvesting process may begin by removing a plant from a field, such as by using a header. The header may cut the agricultural crops and may transport the cut crops to a processing system of the combine.

Generally, the harvester may be driven through a field to harvest crops. A cutter bar assembly of the header may engage the soil surface to cut the agricultural crops proximate to the soil surface. As the harvester moves through the field, the cutter bar assembly may flex to adjust to the contour of the field. The cutter bar assembly of the header is urged upwardly by a hydraulic system to control a contact force between the cutter bar assembly and the ground (e.g., the soil surface). However, the hydraulic system may be slow to move the cutter bar assembly to a target position relative to the ground after being raised (e.g., when a raised portion of the soil is encountered).

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a header of a harvester includes a cutter bar assembly, a side deck, and an airbag. The side deck includes a conveyor and an arm assembly. The cutter bar assembly is configured to cut crops, and the conveyor is configured to transport the crops cut by the cutter bar assembly toward a center of the header. The arm assembly is coupled to the cutter bar assembly and to the at least one airbag. The arm assembly is configured to pivot to enable the cutter bar assembly to flex along a lateral axis of the header. The airbag is configured to apply a substantially constant force to the at least one arm assembly.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Certain embodiments of the present disclosure include a header for a harvester. Certain harvesters are configured to cut agricultural crops via a cutter bar assembly of the header. As the cutter bar assembly cuts the crops, conveyor(s) coupled to draper deck(s) of the header move the crops toward a crop processing system of the harvester. For example, conveyor(s) on side draper deck(s) may move the crops toward a conveyor on an infeed draper deck at a center of the header. The conveyor on the infeed draper deck may move the crops toward the crop processing system. Each of the side draper deck(s) and the infeed draper deck includes arm(s) and linkage(s) that are coupled to airbag(s). The arm(s) are also coupled to the cutter bar assembly. As the harvester moves over certain types of terrain and/or performs certain operations, the arms may pivot relative to a header frame to enable the cutter bar assembly to flex. The airbag(s) provide an upward force on the cutter bar assembly, via the arm(s), to control the contact force between the cutter bar assembly and the ground. As such, the airbag(s) enable the cutter bar assembly to follow contours of the ground.

Figure 1:
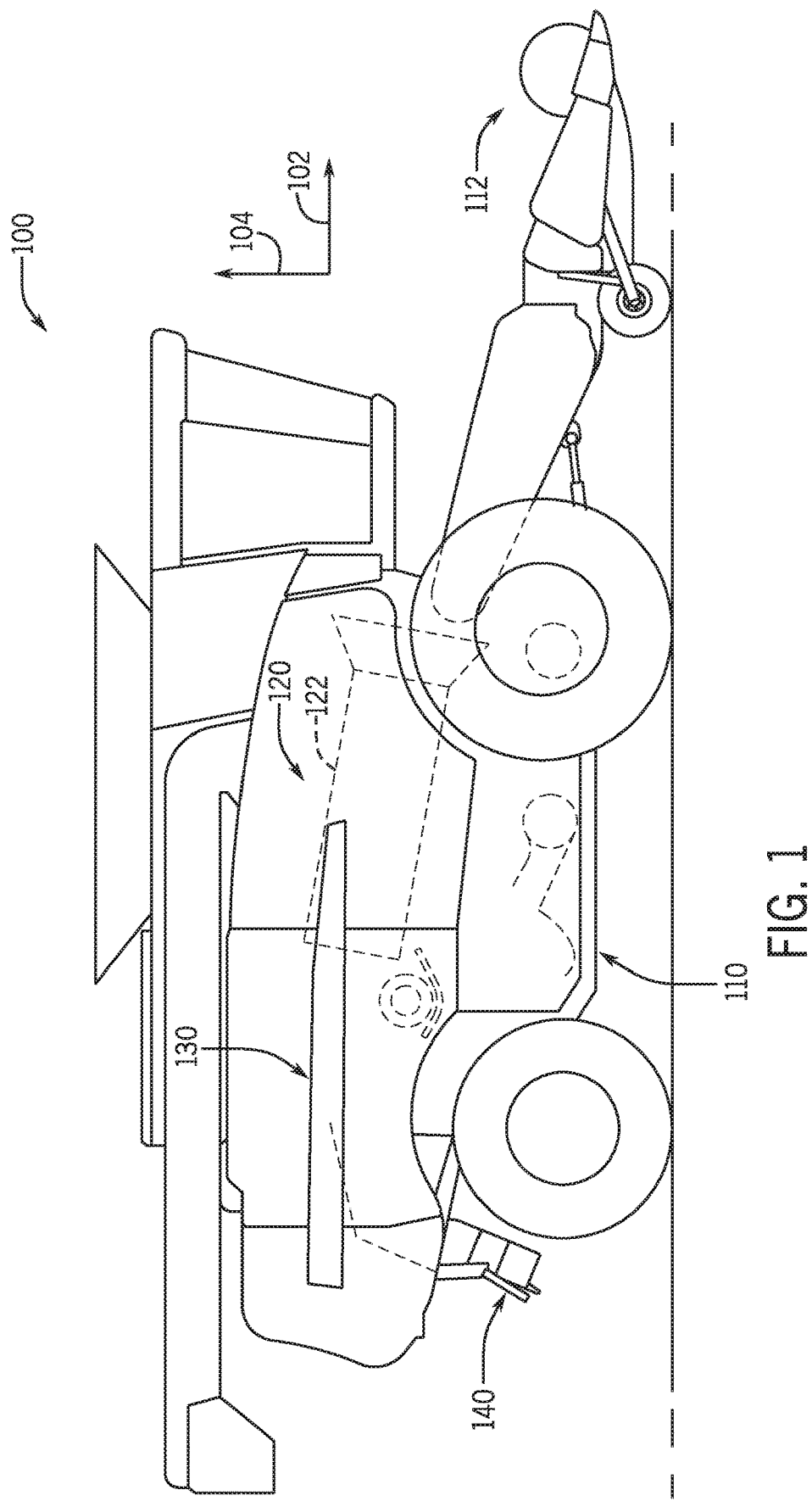
FIG. 1 is a side view of an embodiment of a harvester having a header, in accordance with an aspect of the present disclosure.

With the foregoing in mind, the present embodiments relating to a header may be utilized within any suitable harvesting system. For example, FIG. 1 is a side view of an embodiment of an agricultural harvester 100 having a header 112. To facilitate discussion, the harvester 100 and certain components of the harvester 100 may be described with reference to a longitudinal axis or direction 102 and a vertical axis or direction 104. The harvester 100 includes a chassis 110 configured to support the header 112 and an agricultural crop processing system 120. As described in greater detail below, the header 112 is configured to cut crops and to transport the cut crops toward an inlet of the agricultural crop processing system 120 for further processing of the cut crops. The agricultural crop processing system 120 receives the cut crops from the header 112 and separates desired crop material from crop residue. As an example, the agricultural crop processing system 120 may include a thresher 122 having a cylindrical threshing rotor that transports the crops in a helical flow path through the harvester 100. In addition to transporting the crops, the thresher 122 may also separate certain desired crop material (e.g., grain) from the crop residue, such as husks and pods, and may enable the desired crop material to flow into a cleaning system located beneath the thresher 122. The cleaning system may remove debris from the desired crop material and may transport the desired crop material to a storage compartment within the harvester 100. The crop residue may be transported from the thresher 122 to a crop residue handling system 130, which may remove the crop residue from the harvester 100 via a crop residue spreading system 140 positioned at the aft end of the harvester 100.

Figure 2:
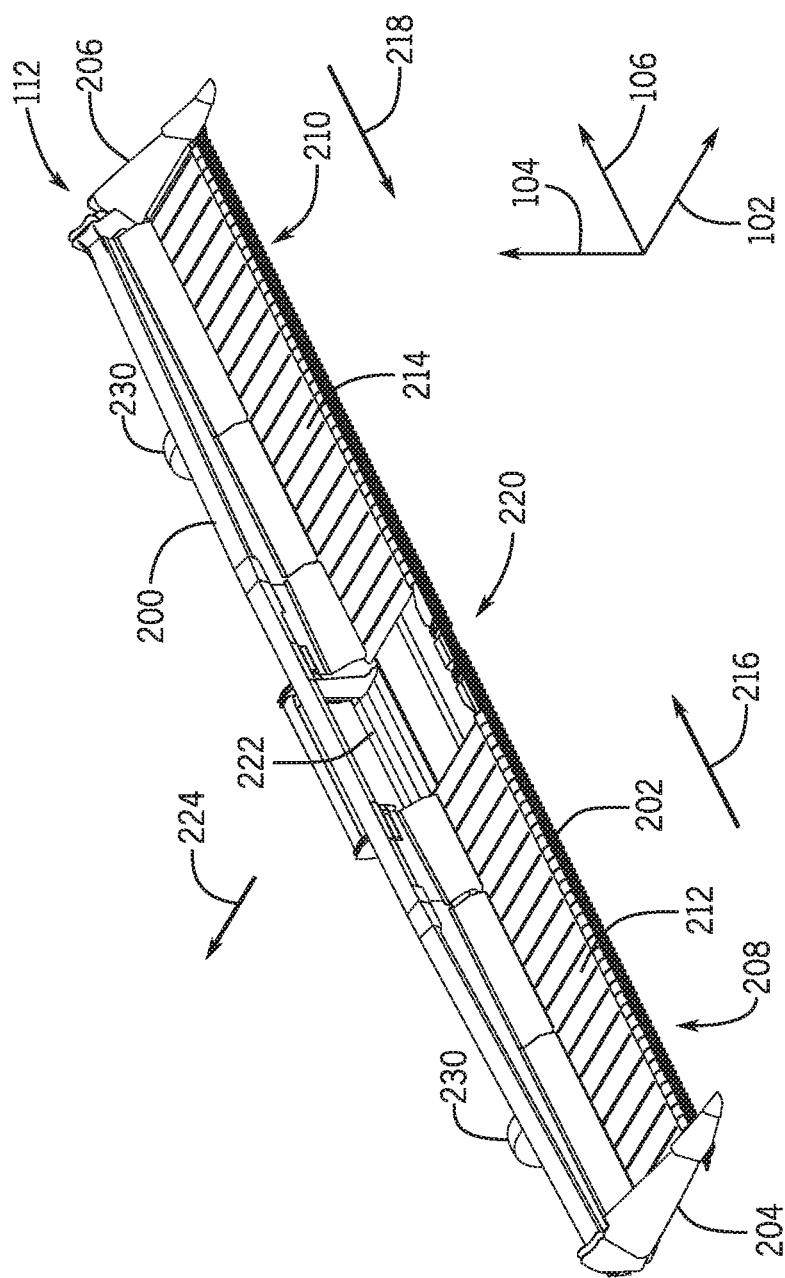
FIG. 2 is a top perspective view of an embodiment of a header that may be used within the harvester of FIG. 1, in accordance with an aspect of the present disclosure.

FIG. 2 is a top perspective view of an embodiment of a header 112 that may be employed within the harvester of FIG. 1. To facilitate discussion, the header 112 and certain components of the header 112 may be described with reference to a lateral axis or direction 106. The header 112 includes a frame 200 that may be removably coupled to a frame of the harvester. The header 112 also includes a cutter bar assembly 202 that extends along the lateral axis 206 between a first header end 204 and a second header end 206 of the frame 200. When the harvester 100 is in operation, blades of the cutter bar assembly 202 may engage and cut a portion of crops. The cut portion of the crops may engage a first side draper deck 208, a second side draper deck 210, and an infeed draper deck 220 (e.g., a reel assembly may drive the cut crops toward the decks). The first side draper deck 208 includes a first side conveyor 212, and the second side draper deck 210 includes a second side conveyor 214. The first side conveyor 212 extends along the lateral axis 106 and moves crops generally in a first laterally inward direction 216. The second side conveyor 214 extends along the lateral axis 106 and moves crops generally in a second laterally inward direction 218. In certain embodiments, side decks (e.g., the first side draper deck 208 and the second side draper deck 210) and/or an infeed deck (e.g., the infeed draper deck 220) of the header 112 may include other configurations such that the conveyors are omitted. For example, the side decks and/or the infeed deck may include augers that may move the crops.

In certain embodiments, the first side draper deck 208 and the second side draper deck 210 include arm assemblies that extend through the first side conveyor and the second side conveyor, respectively. The arm assemblies are coupled to the cutter bar assembly 202 at first ends and are coupled to airbags at second ends. The arm assemblies are also pivotally coupled to the frame 200 generally between the first ends and the second ends. The pivotal coupling between the arms and the frame 200 enables the cutter bar assembly 202 to flex during operation of the header 112. For example, the airbags provide a downward force on the second ends of the arms that drives the first ends of the arms and the cutter bar assembly 202 upwardly. As such, the airbags control the contact force between the cutter bar assembly 202 and the ground and enable the cutter bar assembly 202 to flex and to follow contours of the ground.

The infeed draper deck 220 is disposed between the first side draper deck 208 and the second side draper deck 210 along the lateral axis 106. As illustrated, the infeed draper deck 220 extends along the longitudinal axis 102. The infeed draper deck 220 includes an infeed conveyor 222. As each of the first side draper deck 208 and the second side draper deck 210 receive the cut portion of the crops, the first side conveyor 212 of the first side draper deck 208 and the second side conveyor 214 of the second side draper deck 210 move the cut portion of the crops toward the infeed draper deck 220 in the first laterally inward direction 216 and in the second laterally inward direction 218, respectively. The infeed deck 220 also receives the cut portion of the crops from the cutter bar assembly 202. The infeed conveyor 222 of the infeed draper deck 220 moves the cut portion of the crops in a longitudinally rearward direction 224 toward the crop processing system.

In certain embodiments, the infeed draper deck 220 includes an arm assembly and a panel assembly that are configured to pivot about a pivot axis. The panel assembly may be coupled to the cutter bar assembly at a first end and pivotally coupled to the header frame at a second end. The arm assembly may also be coupled to the panel assembly and to the airbags. As the arm assembly and the panel assembly pivot about the pivot axis, the airbags are configured to control the contact force between the cutter bar assembly 202 and the ground.

As illustrated, the header 112 includes wheels 230 configured to support the header frame in certain operating conditions. As the header 112 traverses the field, the cutter bar assembly 202 may flex. For example, the cutter bar assembly 202 may flex to generally match a contour of the field surface (e.g., the ground). The ability of the cutter bar assembly 202 to flex enables the harvester to precisely cut the crops at a target height, thereby increasing crop yields while harvesting.

Figure 3:
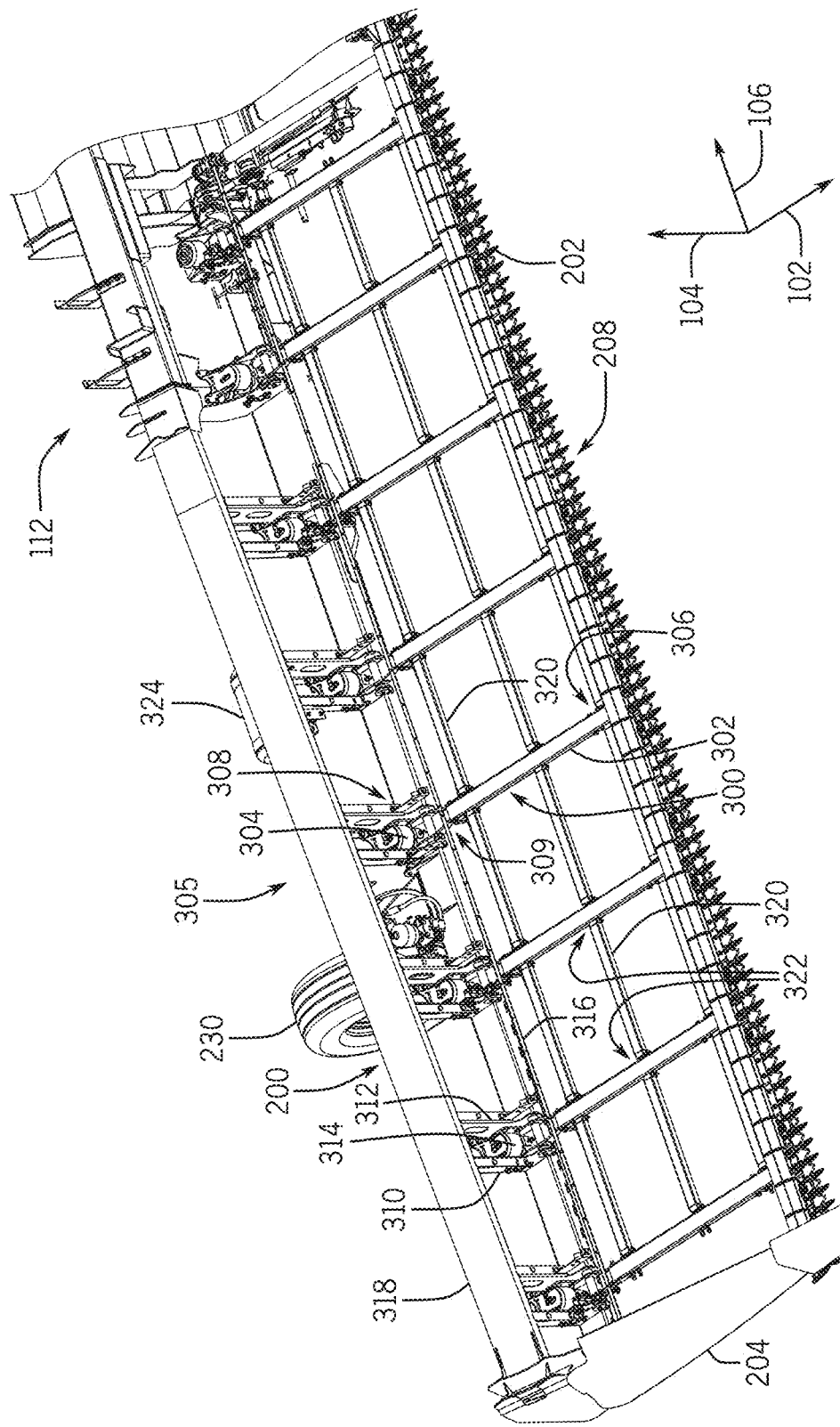
FIG. 3 is a top perspective view of an embodiment of a side draper deck of the header of FIG. 2, in accordance with an aspect of the present disclosure.

FIG. 3 is a top perspective view of the first side draper deck 208 of the header 112 of FIG. 2. To better illustrate components of the first side draper deck 208, the first side conveyor is omitted in FIG. 3. As illustrated, the first side draper deck 208 includes arm assemblies 300 distributed along the lateral axis 106 and extending along the longitudinal axis 102. Each arm assembly 300 extends through the first side conveyor. For example, the first side conveyor may rotate over and around the arm assemblies 300 during operation of the header.

The header 112 includes airbags 304 that provide a substantially constant force to each arm assembly 300 to control the contact force between the cutter bar assembly 202 and the ground. For example, each arm assembly 300 is coupled to the cutter bar assembly 202 at a first end 306 and coupled to a respective airbag 304 at a second end 308. The airbags 304 are included within an air system 305 of the header. Each arm assembly 300 is configured to pivot about a pivot joint 309, which is positioned between the first end 306 and the second end 308 of the arm assembly 300. As illustrated, the first side draper deck 208 includes eight arm assemblies 300 disposed along the lateral axis 106. In certain embodiments, the first side draper deck 208 may include more or fewer arm assemblies 300 (e.g., two arm assemblies, three arm assemblies, four arm assemblies, nine arm assemblies, ten arm assemblies, etc.). As each arm assembly 300 pivots about the respective pivot joints 309, the airbags 304 apply the substantially constant force to each arm assembly 300. The substantially constant force may vary within a specific percentage range. For example, the substantially constant force may vary within 0%-5%, 0%-10%, 2%-8%, 1%-5%, 2%-5%, and within other ranges.

Because the airbags 304 are configured to apply the substantially constant force to the second end 308 of the arm assembly 300, the cutter bar assembly 202 is able to accurately follow the contour of the ground. For example, as the contour of the ground changes, the arm assemblies 300 may pivot, and throughout the pivoting range of motion, the airbags 304 may apply the substantially constant force to the arm assemblies 300. As a result, the arm assemblies 300 may smoothly pivot and the cutter bar assembly 202 may smoothly flex to adjust to the changing contour of the ground. By comparison, systems that apply a variable force or that include hydraulic systems that have friction at various seals may not be configured to allow their respective arms to smoothly pivot as the contour of the ground changes. For example, such systems may include delayed responses to contour changes such that the systems are not able to as quickly and smoothly respond to the contour changes. As such, the embodiments disclosed herein enable the header 112 to closely follow the contour of the ground and offer substantial improvements over other systems.

As illustrated, the frame 200 of the header 112 includes first struts 310 and second struts 312 distributed along the lateral axis 106. Each airbag 304 is coupled to a respective first strut 310 and to a respective second strut 312 via a mounting bracket 314 that extends between the respective first strut 310 and the respective second strut 312. The frame 200 also includes a lower frame member 316 and an upper frame member 318 that extend along the lateral axis 106. The first struts 310 and the second struts 312 are coupled to and extend between the lower frame member 316 and the upper frame member 318. Each arm assembly 300 is coupled to the respective first strut 310 and the respective second strut 312 at the pivot joint 309. Each arm assembly 300 is configured to pivot about the pivot joint 309 relative to the frame 200, the respective first strut 312, and the respective second strut 314.

The first side draper deck 208 includes lateral supports 320 pivotally coupled to the arm assemblies 300 at joints 322. As the arm assemblies 300 pivot about the respective pivot joints 309, the lateral supports 320 rotate at the joints 322. For example, as the header 112 is driven over the surface of the field, the arm assemblies 300 pivot about their respective pivot joints 309. The lateral supports 320 also rotate with respect to the arm assemblies 300 at the joints 322. Further, the joints 322 may include a slot within each respective lateral support 320 and a pin rigidly coupled to each respective arm assembly 300 such that each pin is disposed within and may slide along a corresponding slot. The pin and slot configuration may enable the lateral supports 320 to slide generally laterally relative to the arm assemblies 300 to enable the arm assemblies 300 to pivot in different directions and relative to one another. The pivoting motion of the arm assemblies 300 and the rotating and sliding motions of the lateral supports 320 enable the first side draper deck 208 and the cutter bar assembly 202 to flex, such that the cutter bar assembly 202 may generally match the contour of the field surface. In certain embodiments, the first side draper deck 208 may include stops that establish a top and a bottom of a pivoting range of motion of the arm assemblies 300. For example, each arm assembly 300 may include a pin that contacts a first stop and a second stop of the header that blocks the pivoting of the arm assemblies 300 beyond the range of motion. The first stop and the second stop may be formed within the first strut 310 and the second strut 312.

As the first side draper deck 208 and the cutter bar assembly 202 flex, the arm assemblies 300 of the first side draper deck 208 pivot about their respective pivot joints 309. The airbags 304 provide the substantially constant force to the arm assemblies 300 to control the contact force between the cutter bar assembly 202 and the ground. For example, the airbags 304 are configured to compress and expand as the arm assemblies 300 pivot. The airbags 304 apply a substantially constant force to the respective arm assemblies 300 throughout a range of motion of the arm assemblies 300.

The header 112 includes a reservoir 324 that supplies air to each airbag 304 to substantially maintain an air pressure in each airbag 304. For example, as each airbag 304 compresses and expands over time, the volume of air within each airbag 304 may vary. To enable the airbags 304 to apply the substantially constant force to the arm assemblies 300, the reservoir 324 supplies the airbags 304 with air and receives air from the airbags 304 to substantially maintain the air pressure within each airbag 304. In certain embodiments, the air pressure in the airbags 304 may be adjusted depending on conditions of the field, the type of crop, and other factors. For example, the operator may control the pressure within each airbag 304 by adjusting setting(s) of a valve assembly and/or a compressor of the air system 305 (i.e., adjusting the setting locally or remotely from a cab of the harvester). Each airbag 304 may be connected to the reservoir 324 via an air line and a push-to-connect connector. For example, an air line may be connected to the reservoir 324 at a first end and to a respective airbag 304 at a second end via push-to-connect connectors. The push-to-connect connector may enable the operator of the header to easily connect and disconnect the air line from the airbag 304. The air lines may extend along the frame 200 from the reservoir 324 to each airbag 304. As illustrated, the air system 305 includes the airbags 304, the reservoir 324, air lines, and valves. In certain embodiments, the air system 305 may include more or fewer components.

As described herein, the header 112 includes the first side draper deck 208 and the second side draper deck. The second side draper deck includes substantially similar components to the first side draper deck 208. For example, the second side draper deck includes the arm assemblies 300 and the lateral supports 320 extending through the second side conveyor. Similar to the first side draper deck 208, the second side draper deck is configured to flex as the arm assemblies 300 pivot in response to variations in the terrain. The airbags are configured to compress and expand to provide the substantially constant force to the arm assemblies 300 and to control the contact force between the cutter bar assembly 202 and the ground. As such, the cutter bar assembly 202 may flex along the first side draper deck 208 and the second side draper deck. In certain embodiments, the first side draper deck 208 and the second side draper deck, or portions thereof, may be configured to flex in opposite directions or in the same direction as the header travels over the field surface. For example, a first portion of the first side draper deck 208 may flex generally upwardly, a second portion of the first side draper deck 208 may flex generally downwardly, a first portion of the second side draper deck may flex generally upwardly, and a second portion of the second side draper deck may flex generally downwardly.

Figure 4:
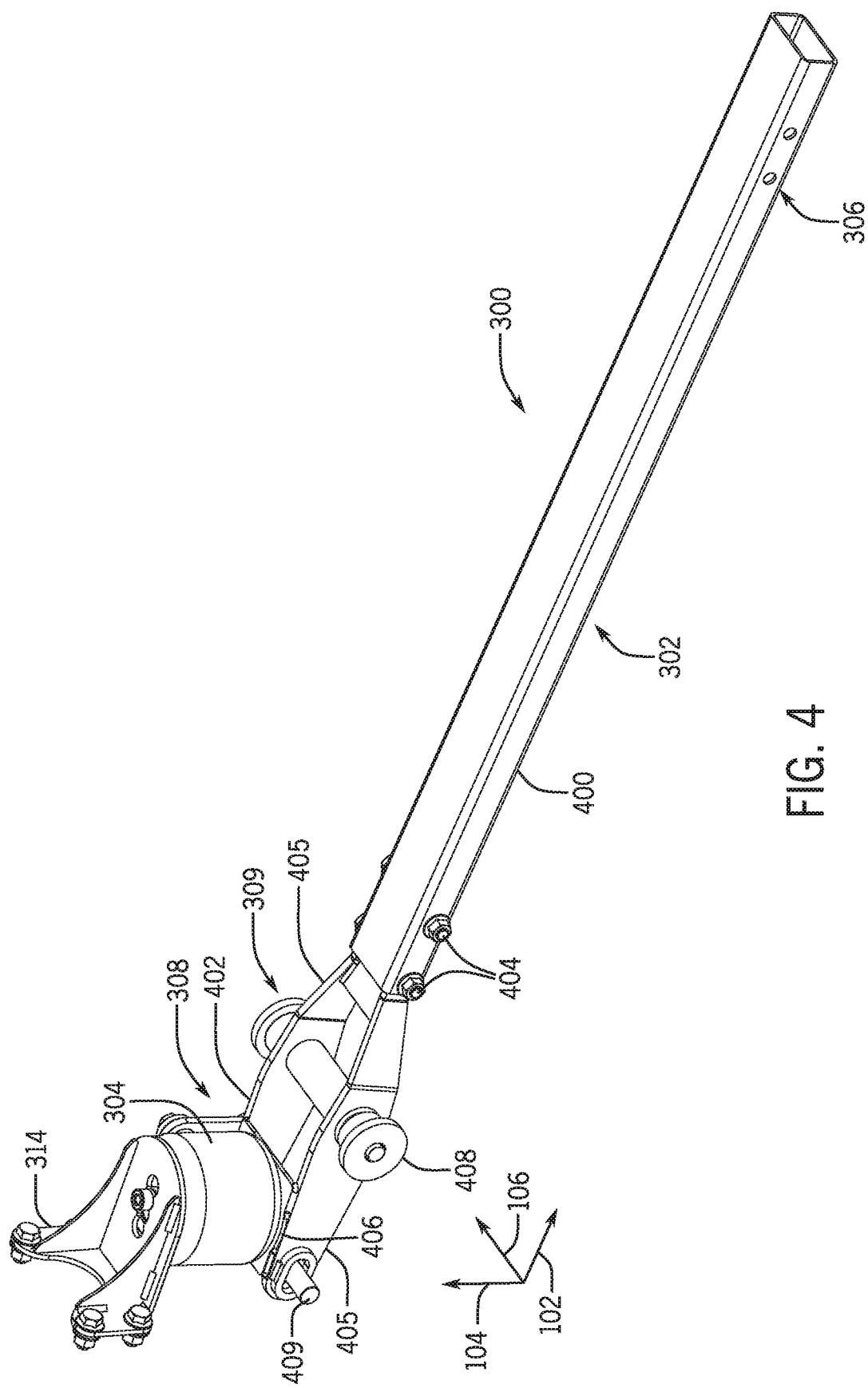
FIG. 4 is a top perspective view of an embodiment of an arm assembly of the header of FIG. 2, in accordance with an aspect of the present disclosure.

FIG. 4 is a top perspective view of the arm assembly 300 coupled to the airbag 304 of FIG. 3. As illustrated, the arm assembly 300 includes an arm 302 that is configured to extend through the conveyor of the side draper deck (e.g., the first side conveyor of the first side draper deck or the second side conveyor of the second side draper deck). The arm 302 is coupled to the cutter bar assembly of the header at the first end 306 and is coupled to the airbag 304 at the second end 308.

The arm 302 includes a bar 400 and a forked member 402 that are coupled to one another by fasteners 404. In certain embodiments, the bar 400 and the forked member 402 may be coupled by another system or may be integrally formed. As illustrated, the forked member 402 includes two prongs 405 separated by a gap. The forked member 402 is coupled to a support plate 406 and to a pivot rod 408. The support plate 406 is disposed generally in the gap between the two prongs 405 of the forked member 402 and is coupled to the two prongs 405. The support plate 406 provides an interface between the arm assembly 300 and the airbag 304, which is coupled to the support plate 406. The pivot rod 408 is coupled to and extends through the forked member 402 along the lateral axis 106, thereby forming the pivot joint 309. For example, as the cutter bar assembly moves generally upwardly and downwardly at the first end 306 of the arm assembly 300, the arm assembly 300 pivots about the pivot rod 408. In certain embodiments, the pivot joint may be located at other portions of the arm assembly 300 (e.g., at a portion of the arm 302).

The airbag 304 is coupled to the support plate 406 and to the mounting bracket 314. The mounting bracket 314 is rigidly coupled to the first strut and to the second strut of the frame of the header. As the arm assembly 300 pivots about the pivot rod 408 at the pivot joint 309, the airbag 304 compresses and expands. For example, if the second end 306 of the arm assembly 300 moves generally downwardly (e.g., the cutter bar assembly moves generally downwardly), the arm assembly 300 pivots about the pivot rod 408, and the second end 308 of the arm assembly 300 moves generally upwardly. As a result, the airbag 304 compresses and provides a substantially constant force to the arm assembly 300 to control the contact force between the cutter bar assembly and the ground.

In another example, if the second end 306 of the arm assembly 300 moves generally upwardly (e.g., the cutter bar assembly moves generally upwardly), the arm assembly 300 pivots about the pivot rod 408, and the second end 308 of the arm assembly 300 moves generally downwardly. As a result, the airbag 304 expands and provides a substantially constant force to the arm assembly 300 to control the contact force between the cutter bar assembly and the ground.

As the arm assembly 300 pivots about the pivot joint 309, the pivoting motion may be blocked by a pin 409. The pin 409 extends through the forked member 402 and controls the range of motion of the arm assembly 300. The pin 409 may be disposed within a first slot of the first strut and a second slot of the second strut of the header. The pin 409 may contact respective tops and bottoms of the slots to block pivoting of the arm assembly 300 beyond the range of motion. For example, as the second end 308 of the arm assembly 300 moves upwardly (e.g., as the cutter bar assembly coupled to the first end 306 moves downwardly), the arm assembly 300 is blocked from further pivoting when the pin 409 contacts the top of each slot (e.g., the first slot and the second slot). As the second end 308 of the arm assembly 300 moves downwardly (e.g., as the cutter bar assembly coupled to the first end 306 moves upwardly), the arm assembly 300 is blocked from further pivoting when the pin 409 contact the bottom of each slot. As such, the pin 409 and the first slot of the first strut and the second slot of the second strut may establish the range of motion of the arm assembly 300.

In certain embodiments, the arm assembly 300 may include other configurations. For example, the arm assembly 300 may be formed of single component. In some embodiments, the forked member 402 and/or the support plate 406 may be omitted such that the airbag 304 is coupled directly to the arm assembly 300. Further, the airbag 304 may be coupled to other portion(s) of the arm assembly 300 other than the second end 308.

Figure 5:
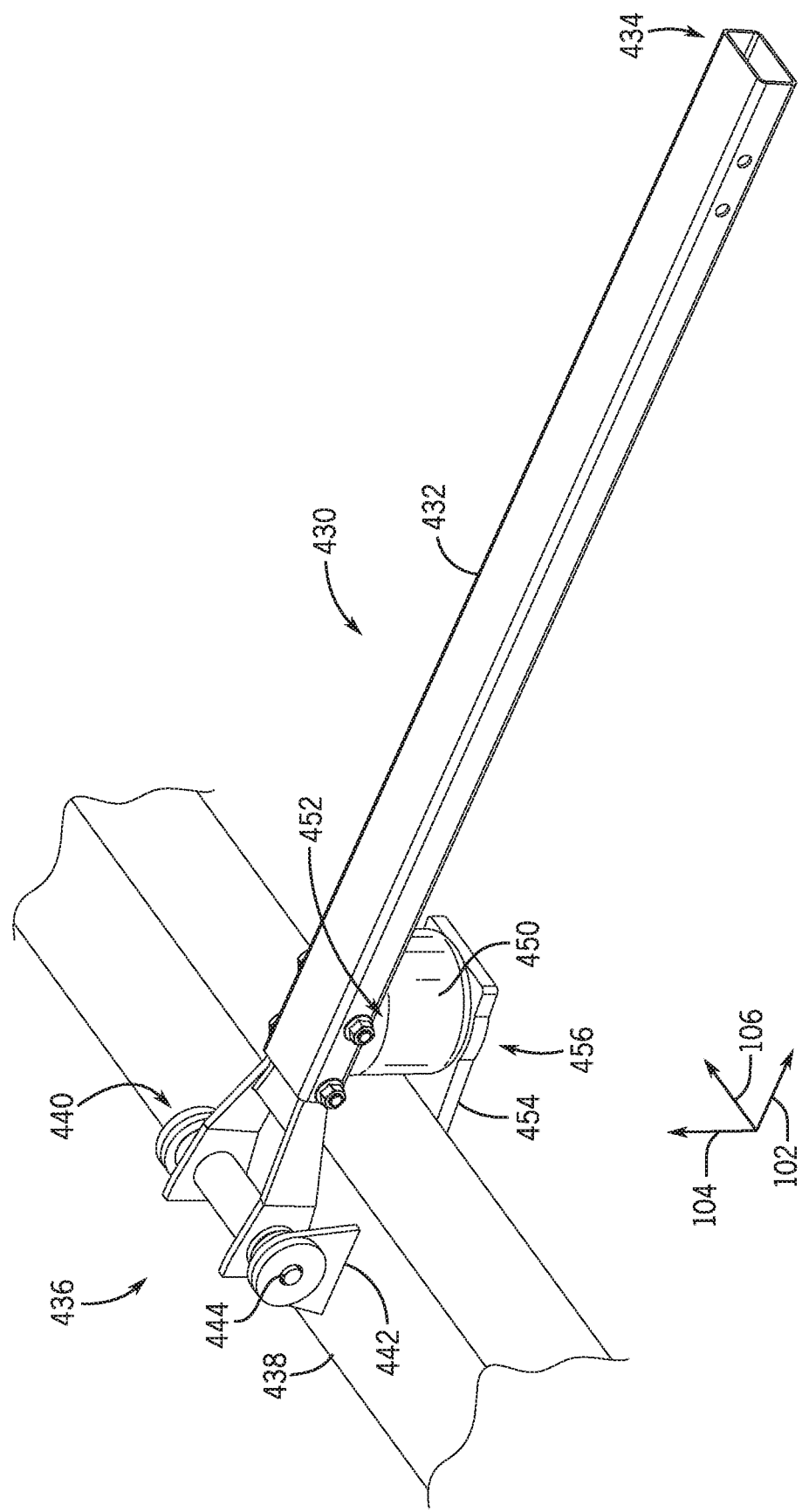
FIG. 5 is a top perspective view of an embodiment of an arm assembly of the header of FIG. 2, in accordance with an aspect of the present disclosure.

FIG. 5 is a top perspective view of an arm assembly 430 that may be employed in the header of FIG. 3. For example, the arm assembly 430 may be included in addition to, or in place of, one or more of the arm assemblies of FIG. 3. As illustrated, the arm assembly 430 includes an arm 432 having a first end 434 that may be coupled to the cutter bar assembly of the header. The arm 432 includes a second end 436 pivotally coupled to a frame member 438 via a pivot joint 440. As illustrated, the pivot joint 440 includes brackets 442 disposed on either side of the arm 432 and a pivot bar 444 extending through the arm 432 and the brackets 442. In certain embodiments, the frame member 438 may be the lower frame member of the header. The arm 432 is configured to pivot about the pivot joint 440 to enable the cutter bar assembly coupled to the first end 434 to move generally upwardly and generally downwardly. In certain embodiments, the arm 432 may extend through a conveyor (e.g., the first conveyor or the second conveyor) of the header.

As illustrated, the arm assembly 430 is also coupled to an airbag 450. The airbag 450 is coupled to the arm assembly 430 at a first end 452 and to a frame bracket 454 at a second end 456. The frame bracket 454 is rigidly coupled to the frame member 438. The airbag 450 is configured to compress and extend to provide a substantially constant force to the arm assembly 430 as the arm 432 pivots about the pivot joint 440. For example, as the cutter bar assembly moves generally downwardly, the arm 432 may pivot generally downwardly, and the first end 452 of the airbag 450 may move generally downwardly causing the airbag 450 to compress. As the cutter bar assembly moves generally upwardly, the arm 432 may pivot generally upwardly, and the first end 452 of the airbag 450 may move generally upwardly causing the airbag 450 to extend. The second end 456 of the airbag 450 may remain rigidly coupled to the frame bracket 454 while the arm 432 pivots. As such, the airbag 450 may compress and extend to provide a substantially constant force to the arm assembly 430 as the cutter bar assembly moves generally downwardly and/or generally upwardly.

Figure 6:
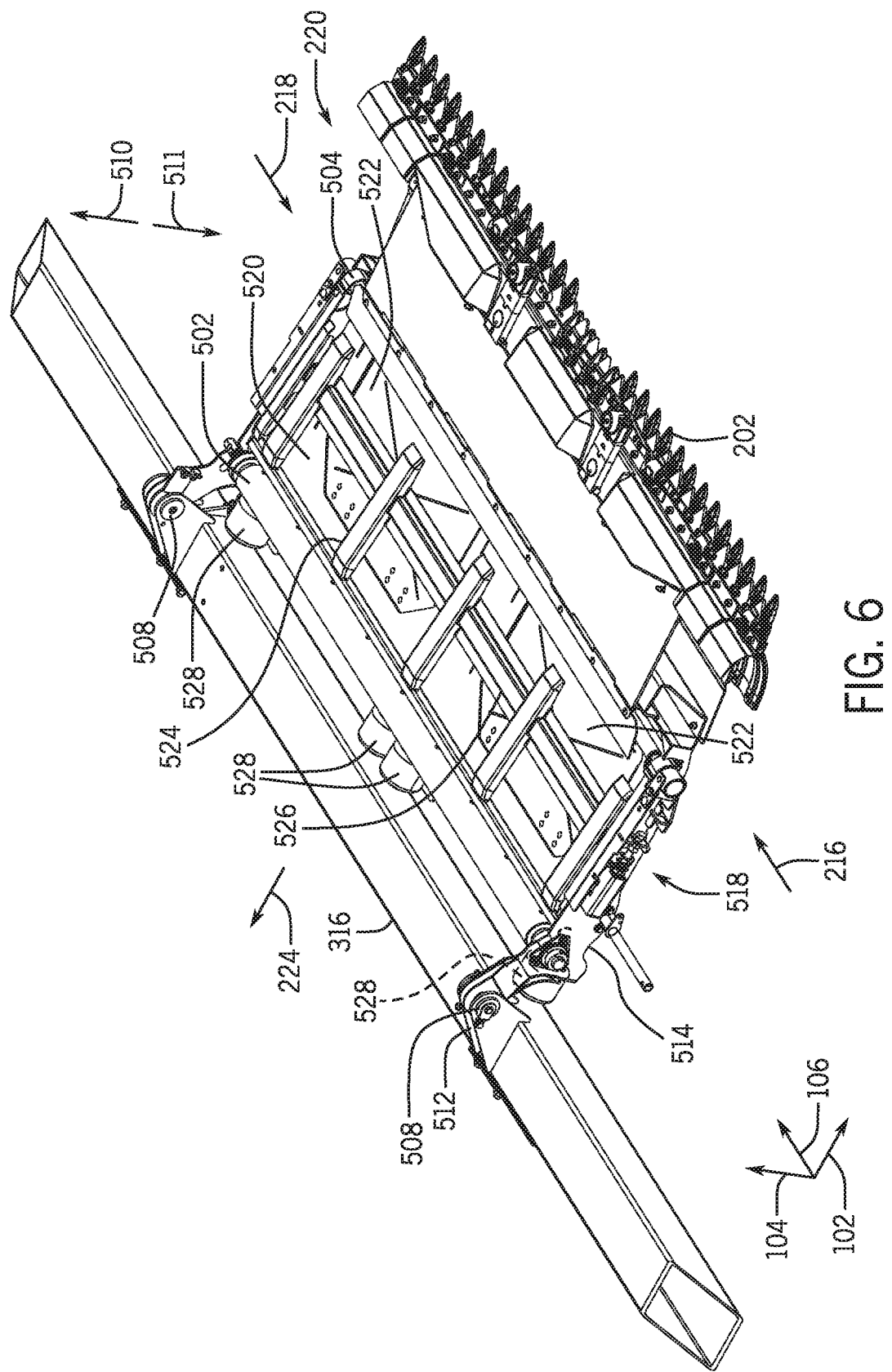
FIG. 6 is a top perspective view of an embodiment of an infeed draper deck of the header of FIG. 2, in accordance with an aspect of the present disclosure.

FIG. 6 is a top perspective view of an embodiment of the infeed draper deck 220 of the header of FIG. 2. To better illustrate components of the infeed draper deck 220, the infeed conveyor is omitted in FIG. 6. The infeed draper deck 220 is coupled to the cutter bar assembly 202 and includes a first roller 502 and a second roller 504. The infeed conveyor is disposed over the first roller 502 and the second roller 504 to facilitate rotation of the infeed conveyor. As described herein, the conveyor of the first side draper deck is configured to move the cut crops toward the infeed draper deck 220 in the first laterally inward direction 216. The conveyor of the second side draper deck is configured to move the cut crops toward the infeed draper deck 220 in the second laterally inward direction 218. The infeed conveyor of the infeed draper deck 220 is configured to move the cut crops received from the conveyor of the first side draper deck, the crops received from the conveyor of the second side draper deck, and the cut crops from the cutter bar assembly 202 toward the crop processing system of the harvester in the longitudinally rearward direction 224.

The infeed draper deck 220 is coupled to the lower frame member 316 at infeed pivot joints 508. The infeed draper deck 220 is configured to pivot about the infeed pivot joints 508 in an upward direction 510 and in a downward direction 511. As illustrated, brackets 512 are coupled to respective side panels 514 of the infeed draper deck 220 at the infeed pivot joints 508. The brackets 512 are rigidly coupled to the lower frame member 316. In certain embodiments, the infeed draper deck may be pivotally coupled to the frame of the header by other suitable connection system (e.g., directly coupled to the frame, coupled via pin(s) and configured to pivot about the pin(s), coupled via other fasteners, etc.). As the header moves over the surface of the field, the infeed draper deck 220 is configured to pivot about the infeed pivot joints 508. For example, the side panels 514 are configured to pivot about the infeed pivot joints 508 in the upward direction 510 and in the downward direction 511.

As illustrated, the infeed draper deck 220 includes a panel assembly 518. The panel assembly 518 includes the side panels 514, a frame panel 520, and interior panels 522. The frame panel 520 is rigidly coupled to the side panels 514. The interior panels 522 are disposed within interior openings of the frame panel 520 and are configured to open to enable access to an interior of the infeed draper deck 220. Further, the infeed draper deck 220 includes longitudinal support arms 524 and lateral support arms 526. The longitudinal support arms 524 extend along the longitudinal axis 102 and are disposed within the infeed conveyor. The lateral support arms 526 extend along the lateral axis 106 and are disposed within the infeed conveyor. The longitudinal support arms 524 and the lateral support arms 526 provide structural support to the infeed draper deck 220. As illustrated, the first roller 502 and the second roller 504 are rotatably coupled to the side panels 514. The infeed conveyor of the infeed draper deck 220 may rotate around the first roller 502, the second roller 504, the longitudinal support arms 524, and the lateral support arms 526. In certain embodiments, the infeed draper deck may include other configurations. For example, certain panels (e.g., the side panels 514, the frame panel 520, the interior panels 522, other panels of the infeed draper deck 220, or a combination thereof) and/or certain support arms (e.g., longitudinal support arms 524 and/or lateral support arms 526) may be omitted. Further, certain panels and/or certain support arms may be a single, continuous component.

The infeed draper deck 220 includes infeed airbags 528 that extend along the longitudinal axis 102. The infeed airbags 528 are configured to provide a substantially constant force to control the contact force between the cutter bar assembly 202 and the ground. For example, as the header moves over the surface of the field, the cutter bar assembly 202 moves generally upwardly in the upward direction 510 and generally downwardly in the downward direction 511. As the cutter bar assembly 202 moves in the upward direction 510 and in the downward direction 511, the panel assembly 518 may pivot about the infeed pivot joints 508 via the side panels 514. The pivoting of the panel assembly 518 causes the infeed airbags 528 to compress and expand. As such, the infeed airbags 528 may compress and expand to provide the substantially constant force to the panel assembly 518 to enable the cutter bar assembly 202 to generally match the contour of the field surface (e.g., to control the contact force between the cutter bar assembly 202 and the ground).

As described herein, the first side draper deck and the second side draper deck include airbags oriented generally vertically along the header. In certain embodiments, the airbags of the first side draper deck and the second side draper deck may be considered a first set of airbags. The infeed airbags 528 of the infeed draper deck 220 that extend generally longitudinally along the header may be considered a second set of airbags. In certain embodiments, the first set of airbags along the first side draper deck and the second side draper deck may be oriented generally longitudinally, and/or the second set of airbags along the infeed draper deck may be oriented generally vertically.

Figure 7:
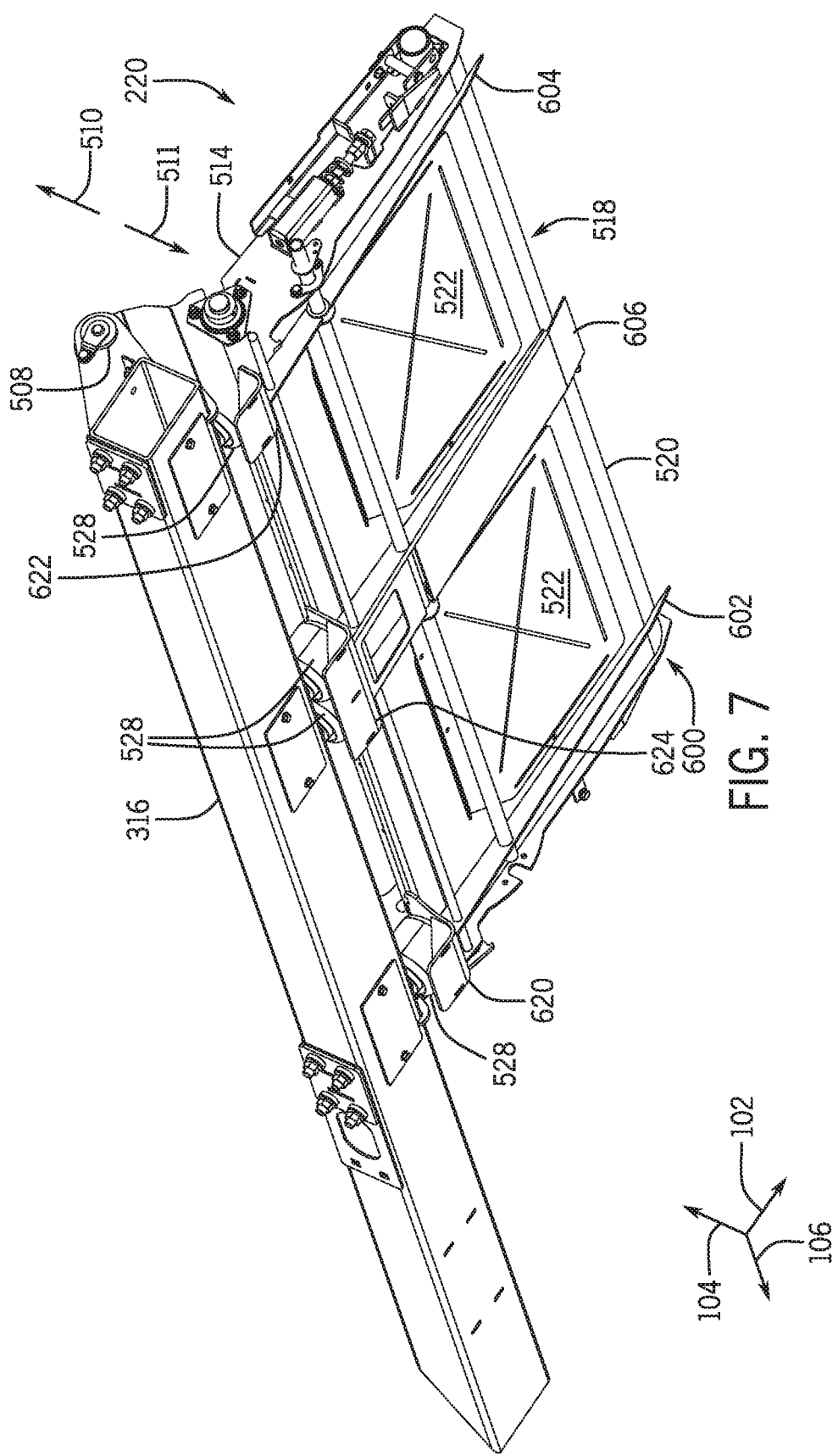
FIG. 7 is a bottom perspective view of the infeed draper deck of FIG. 6, in accordance with an aspect of the present disclosure.

FIG. 7 is a bottom perspective view of the infeed draper deck 220 of FIG. 6. As illustrated, the infeed draper deck 220 includes an infeed arm assembly 600 extending below and coupled to the panel assembly 518. The infeed arm assembly 600 includes a first infeed arm 602, a second infeed arm 604, and a middle infeed arm 606. The first infeed arm 602 is coupled to a first portion of the frame panel 520, the second infeed arm 604 is coupled to a second portion of the frame panel 520, and the middle infeed arm 606 is coupled to a middle portion of the frame panel 520. Each of the first infeed arm 602, the second infeed arm 604, and the middle infeed arm 606 extend below the frame panel 520 along the longitudinal axis 102. As illustrated, the middle infeed arm 606 is substantially wider along the lateral axis 106 than the first infeed arm 602 and the second infeed arm 604.

The arm assembly 600 is configured to provide stability to the infeed draper deck 220 as the infeed draper deck 220 pivots during operation of the header. For example, the arm assembly 600 may contact the field surface as the header is moving. The arm assembly 600 blocks other portions of the infeed draper deck 220 from contacting the field surface and may provide support for the infeed conveyor, the first roller 502, the second roller 504, and the panel assembly 518 as the header moves over the field surface. Further, the arm assembly 600 is configured to move generally in the upward direction 510 and in the downward direction 511 with the panel assembly 518 as the panel assembly 518 pivots about the infeed pivot joints 508.

The infeed draper deck 220 includes a first end airbag bracket 620, a second end airbag bracket 622, and a middle airbag bracket 624 coupled to the arm assembly 600 and to the infeed airbags 528. As illustrated, the first infeed arm 602 is coupled to the first end airbag bracket 620. The second infeed arm 604 is coupled to the second end airbag bracket 622. The middle infeed arm 606 is coupled to the middle airbag bracket 624. The first end airbag bracket 620 provides an interface to between the first infeed arm 602 and the respective infeed airbag 528, which is coupled to the first end airbag bracket 620. The second end airbag bracket 622 provides an interface between the second infeed arm 604 and to the respective infeed airbag 528, which is coupled to the second end airbag bracket 622. The middle airbag bracket 624 provides an interface between the middle infeed arm 606 and the two respective infeed airbags 528, which are coupled to the middle airbag bracket 624.

In certain embodiments, the infeed arm assembly 600 may include other configurations. For example, the arms of the infeed arm assembly 600 may be a single component and/or may be integrally formed with panel(s) of the panel assembly 518. Further, in some embodiments, the infeed draper deck 220 may be coupled to the infeed airbags 528 differently. For example, the infeed draper deck 220 may be coupled to the infeed airbags 528 via a single, continuous infeed airbag bracket extending between the arm assembly 600 and the airbags 528.

Figure 8:
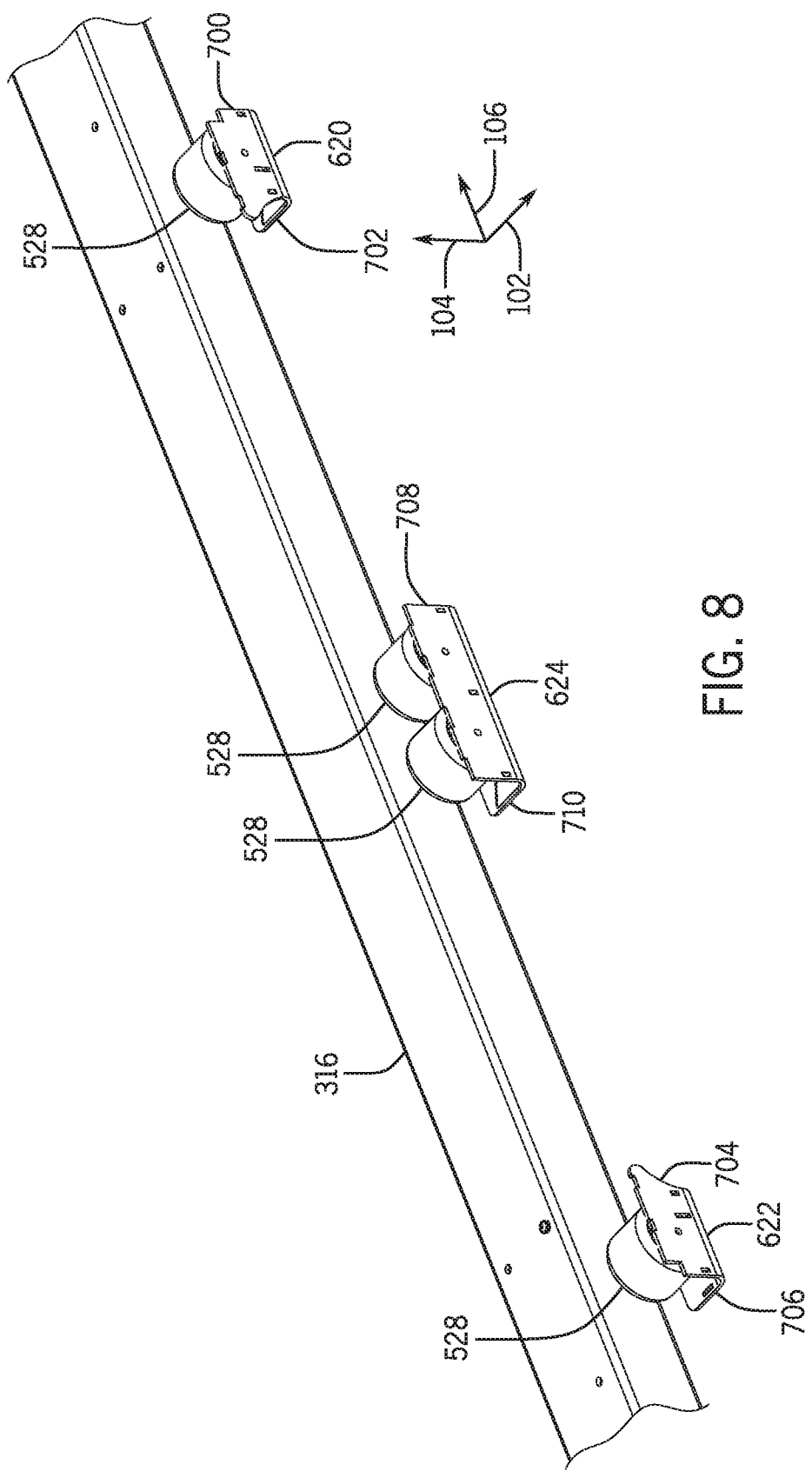
FIG. 8 is a perspective view of an embodiment of a lower frame member and airbags of the header of FIG. 2, in accordance with an aspect of the present disclosure.

FIG. 8 is a perspective view of an embodiment of the lower frame member 316, the infeed airbags 528, and the airbag brackets of FIG. 7. The first end airbag bracket 620 includes a first portion 700 that extends generally along the vertical axis 104 and a second portion 702 that extends generally along the longitudinal axis 102 below the respective airbag 528. The first portion 700 is coupled to the first infeed arm and to the respective airbag 528. As such, the first portion 700 provides an interface between the first infeed arm and the respective airbag 528 to enable the airbag 528 to provide a substantially constant force to the arm assembly as the arm assembly pivots and the cutter bar assembly flexes.

The second end airbag bracket 622 includes a first portion 704 that extends generally along the vertical axis 104 and a second portion 706 that extends generally along the longitudinal axis 102 below the respective airbag 528. The first portion 704 is coupled to the second infeed arm and to the respective airbag 528. As such, the first portion 704 provides an interface between the second infeed arm and the respective airbag 528 to enable the airbag 528 to provide a substantially constant force to the arm assembly as the arm assembly pivots and the cutter bar assembly flexes.

The middle airbag bracket 624 includes a first portion 708 that extends generally along the vertical axis 104 and a second portion 710 that extends generally along the longitudinal axis 102 below the two respective airbags 528. The first portion 708 is coupled to the middle infeed arm and to the two respective airbags 528. As such, the first portion 708 provides an interface between the middle infeed arm and the respective airbags 528 to enable the airbags 528 to provide a substantially constant force to the arm assembly as the arm assembly pivots and the cutter bar assembly flexes.

The second portion of each airbag bracket (e.g., the second portion 702 of the first end airbag bracket 620, the second portion 704 of the second end airbag bracket 622, and the second portion 710 of the middle airbag bracket 624) are configured to move over the field surface during operation of the header. For example, the second portion 702, the second portion 704, and the second portion 710 may contact the field surface as the header is moving. As such, each of the second portion 702, the second portion 704, and the second portion 710 may block the respective airbags from contacting the field surface.

In certain embodiments, the airbag brackets (e.g., the first end airbag bracket 620, the second end airbag bracket 622, and the middle airbag bracket 624) may include alternative configurations. For example, each airbag bracket may include only the first portion that provides an interface between the respective airbag bracket and the respective arm of the arm assembly. In some embodiments, the airbag brackets may include third portions that extend generally above the airbags. Further, as described above, the airbag brackets may be formed as a single, continuous airbag bracket that provides an interface between the airbags and the arm assembly.

As described herein, the airbags coupled to the arm assemblies of the first side draper deck and the second side draper deck are configured to apply the substantially constant force to the arm assemblies to control the contact force between the cutter bar assembly and the soil surface. Further, the airbags coupled to the infeed draper deck are configured to apply the substantially constant force to the infeed draper deck to control the contact force between the cutter bar assembly and the soil surface. In certain embodiments, the substantially constant force applied by the airbags to the arm assemblies and the substantially constant force applied by the airbags to the infeed draper deck may be generally similar and/or the same. As such, the airbags coupled to the first side draper deck, the second side draper deck, and the infeed draper deck may apply generally similar forces and may be at generally similar pressures. The generally similar pressures of the airbags facilitates operation of the header. For example, the operator of the header may maintain the airbags at the generally similar pressures via the air system described herein.

In certain embodiments, the airbags coupled to the first side draper deck, the airbags coupled to the second side draper deck, the airbags coupled to the infeed draper deck, or a combination thereof, may be omitted. Further, in some embodiments of the header, the first side draper deck, the second side draper deck, the infeed draper deck, or a combination thereof, may be omitted. Additionally, in certain embodiments, the number and arrangement of the airbags coupled to each of the first side draper deck, the second side draper deck, and the infeed draper deck may be different. For example, each deck of the first side draper deck, the second side draper deck, and the infeed draper deck may include more or fewer airbags configured to provide the substantially constant force to control the contact force between the cutter bar assembly and the ground As described herein, a header for a harvester includes arm assemblies that extend through side draper decks of the header. The arm assemblies are coupled to a cutter bar assembly at a first end and an airbag at a second end. The arm assemblies are configured to pivot to enable the cutter bar assembly to flex, and the airbags are configured compress and expand as the arm assemblies pivot. The airbags provide a substantially constant force to the arm assemblies to control a contact force between the cutter bar assembly and the ground. The header further includes an infeed draper deck that is pivotally coupled to a frame of the header, to airbags, and to the cutter bar assembly. The infeed draper deck is configured pivot relative to the frame, and the airbags are configured to a substantially constant force to a panel assembly and an arm assembly of the infeed draper deck. The pivoting motion of the infeed draper deck enables the cutter bar assembly to flex. As the header moves over a field surface, the cutter bar assembly may flex to generally match a contour of the field surface. The arm assemblies and the infeed draper deck may pivot as the cutter bar assembly flexes, and the airbags may provide the substantially constant force to the arm assemblies to control the contact force between the cutter bar assembly and the ground.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A header of a harvester, comprising:
    a frame;
    a cutter bar assembly configured to cut crops;
    a side deck comprising a conveyor and at least one arm assembly, wherein the conveyor is configured to transport the crops cut by the cutter bar assembly toward a center of the header;
    a pivot rod coupled to the at least one arm assembly, wherein the pivot rod pivotally couples the at least one arm assembly to the frame; and
    at least one airbag comprising a first end coupled to the at least one arm assembly and a second end coupled to the frame, wherein the at least one arm assembly is coupled to the cutter bar assembly, the at least one arm assembly is configured to pivot about the pivot rod to enable the cutter bar assembly to flex along a lateral axis of the header, an entirety of the at least one airbag is positioned forward of the pivot rod relative to a longitudinal direction extending from the pivot rod toward the cutter bar assembly, and the at least one airbag is configured to apply a substantially constant force to the at least one arm assembly.

2. The header of claim 1, wherein the at least one airbag is configured to apply the substantially constant force to the at least one arm assembly to control a contact force between the cutter bar assembly and a field surface.

3. The header of claim 1, further comprising a reservoir fluidly coupled to the at least one airbag, wherein the reservoir is configured to supply air to the at least one airbag.

4. The header of claim 1, further comprising at least one lateral support, wherein the at least one arm assembly comprises a plurality of arm assemblies, the at least one lateral support extends between two arm assemblies of the plurality of arm assemblies, and the at least one lateral support is configured to rotate about the two arm assemblies of the plurality of arm assemblies.

5. The header of claim 1, wherein the at least one arm assembly extends longitudinally along the header.

6. The header of claim 1, wherein the at least one arm assembly extends through the conveyor.

7. The header of claim 1, wherein the frame comprises a frame bracket, and the second end of the at least one airbag is coupled to the frame bracket of the frame.

8. A header of a harvester, comprising:
    a frame;
    a cutter bar assembly configured to cut crops along a field surface;
    an infeed deck pivotally coupled to the frame and coupled to the cutter bar assembly, wherein the infeed deck is configured to move the crops cut by the cutter bar assembly toward a crop processing system of the harvester; and
    at least one airbag coupled to the frame and to the infeed deck, wherein the at least one airbag is configured to provide a substantially constant force to the infeed deck.

9. The header of claim 8, wherein the infeed deck and the at least one airbag extend generally longitudinally along the header.

10. The header of claim 8, wherein the substantially constant force provided by the at least one airbag controls a contact force between the cutter bar assembly and the field surface.

11. The header of claim 8, wherein the infeed deck comprises an infeed conveyor.

12. The header of claim 8, further comprising a reservoir fluidly coupled to the at least one airbag, wherein the reservoir is configured to supply air to the at least one airbag.

13. A header of a harvester, comprising:
    a frame;
    a cutter bar assembly configured to cut crops;
    a first side deck comprising a first side conveyor and at least one arm assembly, wherein the at least one arm assembly extends through the first side conveyor, and the first side conveyor is configured to transport the crops cut by the cutter bar assembly toward a center of the header;
    an infeed deck pivotally coupled to the frame and disposed at the center of the header, wherein the infeed deck is configured to receive the crops from the first side deck and to move the crops toward a crop processing system; and
    a plurality of airbags comprising at least one first airbag and at least one second airbag, wherein the at least one first airbag is coupled to the frame and to the at least one arm assembly of the first side deck, the at least one second airbag is coupled to the frame and to the infeed deck, and the at least one arm assembly is configured to pivot to enable the cutter bar assembly to flex along a lateral axis of the header.

14. The header of claim 13, wherein the at least one first airbag is configured to apply a substantially constant force to the at least one arm assembly, and the at least one second airbag is configured to apply the substantially constant force to the infeed deck.

15. The header of claim 13, wherein the at least one first airbag is disposed generally vertically along the header, and the at least one second airbag is disposed generally longitudinally along the header.

16. The header of claim 13, further comprising a second side deck, wherein the infeed deck is disposed between first side deck and the second side deck.

17. The head of claim 16, wherein the second side deck comprises a second side conveyor and at least one second arm assembly, wherein the at least second one arm assembly extends through the first side conveyor, and the at least one second arm assembly is configured to pivot to enable the cutter bar assembly to flex along the lateral axis of the header.

* * * * *